Patented Nov. 10, 1925.

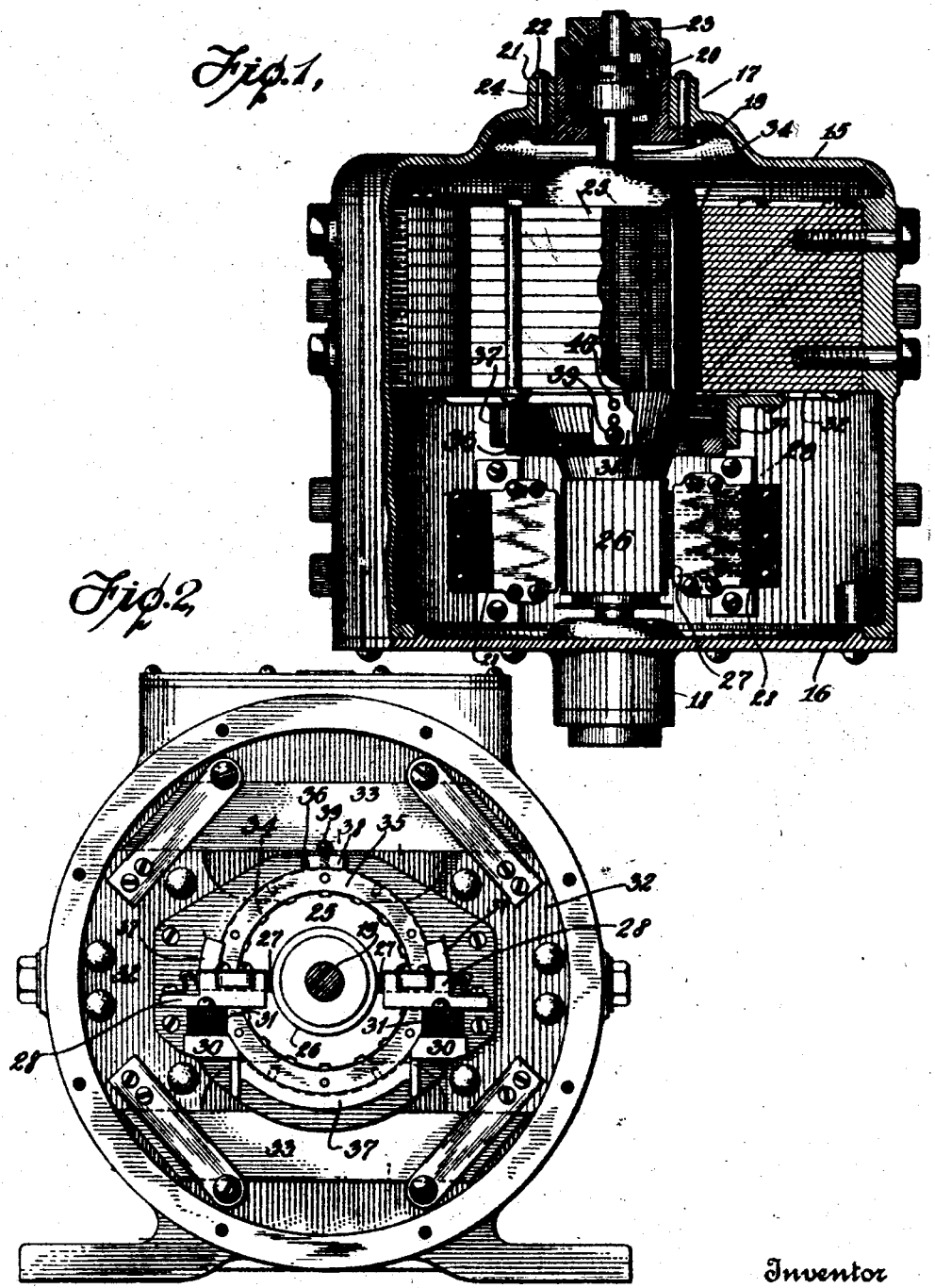

1,560,750

UNITED STATES PATENT OFFICE.

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

GENERATOR FOR USE IN SPEED-INDICATOR SYSTEMS.

Application filed January 21, 1921. Serial No. 438,930.

*To all whom it may concern:*

Be it known that I, FRANK W. WOOD, a citizen of the United States, and resident of Montclair, in the county of Essex and State of New Jersey, have invented certain new and useful Improvements in Generators for Use in Speed-Indicator Systems, of which the following is a specification.

This invention relates to an electrical speed indicator system and more particularly to an indicator of the type in which the armature of the generator is electrically connected to a speed indicating instrument of the voltmeter type and has special reference to the provision of an indicator in which the generator is provided with means for adapting it to a speed indicating instrument and for maintaining such adaptation.

In apparatus of the type referred to, the shaft of a generator is connected to a rotating element, the speed of which is desired to be measured, the armature of the generator being connected to a voltmeter calibrated to read directly in units of speed. If the generator is supplied with field magnets having a constant strength, the electromotive force generated will be directly proportional to the speed of the generator shaft, this type of instrument therefore yielding a straight line curve in the relation between the speed and the generated E. M. F. and being therefore utilizable with a voltmeter having a uniform calibration over a long range.

One of the difficulties in this type of instrument has been to provide a generator of simple design and of low manufacturing cost which will yield a constant magnetic field to the extent necessary in precision instruments. My invention therefore contemplates the provision of a generator of simple design in which the characteristics of the generator may be maintained constant to the extent necessary for precision work.

It has also been found desirable to provide a generator which may be easily adapted to a voltmeter having a predetermined calibration, the characteristics of the generator being adjustable to fit the preconceived arrangement of the voltmeter. To provide such means in which the characteristics can be maintained constant during a long period of use is a further obvious desideratum.

The principal objects of my invention therefore include, besides the provisions of a generator of simple design in which the magnetic field operative on the armature coils is maintained constant, the provision of a speed indicator system in which the characteristics of the generator may be adjusted to fit the predetermined characteristics of the voltmeter; the further provision of such a system in which such characteristics may be maintained constant for a long period of use of the apparatus, the provision of a novel generator having a permanent magnet system, means being provided for compensating for the loss of magnetism of the permanent magnet, and the further provision of a speed indicator system having such a generator in which the active field may be microscopically adjusted with relation to the speed indicator for the purpose of providing a precision speed indicating instrument.

To the accomplishment of the foregoing and such other objects as may hereinafter appear, my invention consists in the elements and their relation one to the other, as hereinafter particularly described and sought to be defined in the claim, reference being had to the accompanying drawings which show a preferred embodiment of my invention and in which Figure 1 is a plan view of a special generator used with the speed indicating system, parts being shown in section and other parts being broken away to disclose the interior construction of the generator, and Figure 2 is an elevational view of the generator with the end cover removed.

The system includes a generator 5, and the lines 6 and 7 connected to the brushes of the generator are connected to a plurality of speed indicators not shown, which are placed at various points at which it is desired to read the speed of a rotating shaft.

My generator of special design is shown in detail in Figures 1 and 2 of the drawings, the operative parts of the generator being housed in a casing 15 made, for example, of any composition metal, the said casing being provided with the end cover 16 removably mounted thereon, as shown clearly in the drawings. The casing 15 and the cover 16 are provided with bearings generally designated as 17 and 18 respectively, the armature shaft 19 being journalled in said bearings, bearings 17 and 18 being substantially similar, one of these bearings being shown in detail and comprises bushing 20 mounted on a boss 21 formed integrally with casing 15, as by means of bolts 22, the bushing 20 being internally threaded at one end to receive the correspondingly threaded bushing cap 23, the bushing and the bushing cap both providing bearings for the armature shaft 19, a ball bearing casing 24 being mounted in said bushing, as clearly shown in the drawings. On the armature shaft 19 is mounted the armature 25, shown herein as of the drum type, the coils of the armature being connected to the commutator 26 also mounted as usual on the armature shaft 19. The brushes 27 are mounted in brush holders 28 on opposite sides of the commutator, the brushes being urged into contact with the commutator by means of springs 29. The brush holders 28 are mounted on brackets 30, insulating blocks 31 being provided between the brush holders and the brackets.

To provide a generator of simple design, involving relatively inexpensive parts and capable of ease of manufacture, my invention contemplates the use of permanent magnets for the field units and these magnets are shown as made up of a series of laminated plates 32 joined together by laminated bars 33, the pole faces 34 of the plates being contoured in the usual way to encircle the armature coils. The plates and bars may be made, for example, of soft iron capable of easy magnetization, the bars and plates being magnetized to provide an excessive field over and above that required for generative purposes.

For the purpose of providing a generator which may be adjustably adapted to voltmeters of preconceived design and for the purpose of maintaining such adaptability and for the further purpose of compensating for the loss of magnetism of the soft iron permanent magnets to maintain a constant relation between the speed of the armature shaft and the generated E. M. F., I provide a magnetic shunt across the poles of the magnet, the reluctance of which is made variable to vary the flux density across the poles active through the armature coils. To this end I have provided a shunt in the form of an annular member 35, this member being made preferably of soft iron, this annulus being externally threaded as at 36 and adapted for rotative movement in a correspondingly threaded substantially semicircular holder 37 and a threaded lug 38. The annulus is capable of axial motion with respect to the poles of the magnet, rotation of the annulus in the threaded holder and lug effecting the necessary axial displacement. Means is provided for retaining the annulus in any adjusted position, such means consisting of a retaining screw 39 received by any of a plurality of threaded bores 40 formed in the lug 38. In adapting a generator of this type to an indicator having predetermined calibrations, the annulus 36 is turned inwardly or outwardly in holder 37 until the required correspondence between the generator and the voltmeter indicator is effected. The shunt provided by the annular member 36 functions to permit an easy path for the leakage of magnetic lines flowing across the poles of the permanent magnet. If a larger dissipation or leakage of the lines across the shunt is required, the annulus is rotated for movement toward the magnet poles, opposite rotation of the annulus resulting in a larger flux density across the pole faces of the magnet and through the armature coils and less leakage across the shunt circuit. After a first adjustment of the generator with respect to the voltmeter, the relation between the voltmeter and the generator may be maintained constant, irrespective of the loss of magnetism of the permanent magnet, such loss being compensated for by adjustability of the annulus away from the poles of the magnet. The magnet initially has an excessive magnetic field over and above that required for generative purposes, many of the lines of flux being dissipated across the shunt. With the loss of magnetism of the magnet, the leakage across the shunt is decreased by moving the annulus away from the field poles, the lines of flux active through the armature coils being able to be maintained constant by these means.

The operation of my device will be apparent from the above description thereof. The E. M. F. generated across the lines of the generator is, as is obvious, directly proportional to the speed of the armature shaft, this speed being indicated at any of the voltmeters directly in R. P. M. To adapt the generator to any particular voltmeter the shunt provided by the annulus 36 is adjusted to and fro from the field poles until the desired cooperation is effected. Due to the threaded interrelation between the shunt and the shunt holder a microscopic adjustment may be effected. If, in the course of time, the permanent magnet loses some of its magnetism, the loss is compensated for by increasing the flux density active through the armature coils by increasing the reductance of the shunt circuit, this being effected as described above by rotating the annulus away from the field poles.

It will therefore be apparent that I have provided an improved generator for speed indicating systems in which the characteristics of the generator may be adjusted to the preconceived characteristics of the voltmeter and the adjusted relation between the two maintained, my novel generator for this purpose being of simple design, being capable of low manufacturing cost and adapted for precision work.

While I have shown my device in the preferred form, it will be obvious that many changes and modifications may be made in the structure disclosed without departing from the spirit of the invention, defined in the following claim.

I claim:

A generator comprising an armature and its shaft, a permanent field magnet, and means for shunting the poles of the field magnet to vary the flux density across the armature, said means comprising a holder including a substantially semi-circular threaded member surrounding the shaft of the armature and attached to the field magnet and a threaded lug, a complementally threaded annular shunt member rotatable therein, and means carried by said lug for securing the shunt member in any adjusted position.

Signed at New York in the county of New York and State of New York this 19th day of January, A. D. 1921.

FRANK W. WOOD.